(12) United States Patent
Guo (10) Patent No.: US 11,329,945 B2
(45) Date of Patent: May 10, 2022

(54) METHOD AND APPARATUS FOR PUBLISHING POST, AND STORAGE MEDIUM

(71) Applicant: GUANGZHOU HUADUO NETWORK TECHNOLOGY CO., LTD., Guangdong (CN)

(72) Inventor: Peihan Guo, Guangzhou (CN)

(73) Assignee: Guangzhou Huaduo Network Technology Co., Ltd., Guangdong (CN)

( * ) Notice: Subject to any disclaimer, the term of this patent is extended or adjusted under 35 U.S.C. 154(b) by 0 days.

(21) Appl. No.: 17/418,143

(22) PCT Filed: Nov. 21, 2019

(86) PCT No.: PCT/CN2019/120020
§ 371 (c)(1),
(2) Date: Jun. 24, 2021

(87) PCT Pub. No.: WO2020/134752
PCT Pub. Date: Jul. 2, 2020

(65) Prior Publication Data
US 2022/0045981 A1   Feb. 10, 2022

(30) Foreign Application Priority Data

Dec. 25, 2018   (CN) .......................... 201811587454.8

(51) Int. Cl.
*H04L 12/58*    (2006.01)
*G06F 16/953*   (2019.01)
(Continued)

(52) U.S. Cl.
CPC ............ *H04L 51/32* (2013.01); *G06F 16/953* (2019.01); *G06Q 50/01* (2013.01); *H04L 51/20* (2013.01)

(58) Field of Classification Search
CPC ....... H04L 51/32; H04L 51/20; G06F 16/953; G06Q 50/01
See application file for complete search history.

(56) References Cited

U.S. PATENT DOCUMENTS 10,310,723 B2 *  6/2019  Rathod ................... G06F 9/451
10,866,946 B1 * 12/2020  Reynolds .......... G06F 16/24578
(Continued)

FOREIGN PATENT DOCUMENTS

CN    101651634 A    2/2010
CN    101924996 A    12/2010
(Continued)

OTHER PUBLICATIONS

International search report and Written opinion for PCT application No. PCT/CN2019/120020 dated Feb. 1, 2020.
(Continued)

*Primary Examiner* — Ninos Donabed
(74) *Attorney, Agent, or Firm* — Knobbe, Martens, Olson & Bear, LLP (57) ABSTRACT

Disclosed is a method for publishing a post. The method includes: in response to receiving a first publish request from a first terminal, first determining, based on location information of the first terminal, whether the first terminal is positioned in a delimited area; and publishing, based on a topic, a post carried in the first publish request only when the first terminal is positioned in the delimited area. Apparatuses for publishing posts and storage mediums are also provided.

15 Claims, 3 Drawing Sheets

(51) Int. Cl.
*G06Q 50/00* (2012.01)
*H04L 51/52* (2022.01)
*H04L 51/222* (2022.01)

(56) References Cited

U.S. PATENT DOCUMENTS

| | | |
|---|---|---|
| 2010/0185663 A1 | 7/2010 | Lei et al. |
| 2011/0137845 A1* | 6/2011 | Ward .................... H04L 51/12 706/50 |
| 2011/0289433 A1 | 11/2011 | Whalin et al. |
| 2011/0320715 A1* | 12/2011 | Ickman .................. G06Q 30/02 711/118 |
| 2012/0191776 A1* | 7/2012 | Ruffner ................ G06F 16/954 709/204 |
| 2012/0254184 A1 | 10/2012 | Choudhary et al. |
| 2012/0278329 A1* | 11/2012 | Borggaard ............ G06Q 10/00 707/738 |
| 2013/0178961 A1* | 7/2013 | Ly ........................ G11B 27/031 700/94 |
| 2013/0254309 A1 | 9/2013 | Jackson et al. |
| 2014/0101144 A1 | 4/2014 | Liu et al. |
| 2014/0123035 A1 | 5/2014 | Liu et al. |
| 2014/0129625 A1 | 5/2014 | Haugen et al. |
| 2014/0214823 A1 | 7/2014 | Barron, Jr. |
| 2015/0074131 A1 | 3/2015 | Fernandez |
| 2015/0289093 A1 | 10/2015 | Petty et al. |
| 2016/0255139 A1* | 9/2016 | Rathod ................. H04L 51/046 709/203 |
| 2017/0140397 A1* | 5/2017 | Booker ............... G06Q 30/0201 |
| 2018/0246983 A1* | 8/2018 | Rathod ............... G06F 16/9535 |
| 2018/0336175 A1* | 11/2018 | Heie ..................... G06F 40/279 |
| 2019/0174289 A1* | 6/2019 | Martin ................... H04L 67/18 |
| 2020/0126174 A1* | 4/2020 | Halse .................... G06F 40/295 |

FOREIGN PATENT DOCUMENTS

| | | |
|---|---|---|
| CN | 103309883 A | 9/2013 |
| CN | 103379165 A | 10/2013 |
| CN | 103532991 A | 1/2014 |
| CN | 103701681 A | 4/2014 |
| CN | 103905471 A | 7/2014 |
| CN | 103942336 A | 7/2014 |
| CN | 104285220 A | 1/2015 |
| CN | 104715014 A | 6/2015 |
| CN | 104838413 A | 8/2015 |
| CN | 105760466 A | 7/2016 |
| CN | 106686105 A | 5/2017 |
| CN | 107784053 A | 3/2018 |
| CN | 109657164 A | 4/2019 |
| WO | 2015153508 A1 | 10/2015 |

OTHER PUBLICATIONS

First office action of Chinese application No. 201811587454.8 dated Dec. 30, 2019.
Second office action of Chinese application No. 201811587454.8 dated Mar. 16, 2020.
Notification to grant patent right for invention of Chinese application No. 201811587454.8 dated Apr. 17, 2020.
Zhijun Yin, et al; Geographical Topic Discovery and Comparison; Proceedings of the 20th international conference on World wide web. ACM; Dec. 31, 2011, entire document.
Yaping Qi, Location-based Timeline from Syndicated Document Stream, Database of Chinese Excellent Master's Dissertations (Information Science and Technology); Feb. 15, 2016, entire document (English translation of Abstract attached).
Gaojun Chen, Research on Geographic Topic Trend in Online Social Network; Database of Chinese Excellent Master's Dissertations (Information Science and Technology); Mar. 15, 2017, entire document (English translation of Abstract attached).
Haoliang Li, Evolutional Computation Based Topic and Location Aware Recommender Algorithm; Database of Chinese Excellent Master's Dissertations (Information Science and Technology); Jul. 15, 2018, entire document (English translation of Abstract attached).

* cited by examiner

FIG. 5

METHOD AND APPARATUS FOR PUBLISHING POST, AND STORAGE MEDIUM

CROSS-REFERENCE TO RELATED APPLICATION

This application is a US National Phase Application of International Application No. PCT/CN2019/120020, filed on Nov. 21, 2019, which claims priority to Chinese Patent Application No. 201811587454.8, filed on Dec. 25, 2018 and entitled "METHOD AND APPARATUS FOR PUBLISHING POST, AND STORAGE MEDIUM," the disclosure of each of which is incorporated herein by reference in its entirety.

TECHNICAL FIELD

The present disclosure relates to the field of information processing technologies, and in particular to a method and apparatus for publishing a post, and a storage medium.

BACKGROUND

With the development of Internet technologies, more and more users choose to publish posts, such as videos and pictures, on social network, so as to interact with other users on the social media applications by means of the published posts. For example, a user can publish a captured video on a micro-blog via a terminal, and other users can view the video on their micro-blog pages.

SUMMARY

According to embodiments of the present disclosure, a method and apparatus for publishing a post, and a storage medium are provided to improve the flexibility in publishing posts. The technical solutions are described as below.

According to a first aspect, a method for publishing a post is provided. The method includes:

receiving a first publish request from a first terminal, wherein the first publish request carries a post to be published and location information of the first terminal;

acquiring a plurality of posts published within a first duration, wherein the first duration is a time duration before current time and closest to the current time;

acquiring location information of a terminal for publishing each of the plurality of posts to obtain a plurality of pieces of location information, wherein the plurality of pieces of location information are in one-to-one correspondence with the plurality of posts;

acquiring a plurality of location information sets by clustering the plurality of pieces of location information;

determining, based on location information contained in each of the plurality of location information sets, a coverage area of each of the plurality of the location information sets and a diameter of the coverage area of each of the plurality of the location information sets;

searching for a target location information set from the plurality of location information sets, wherein the quantity of location information contained in the target location information set is greater than a reference quantity, and a diameter of the coverage area of the target location information set is smaller than a reference diameter;

determining a topic based on posts corresponding to the location information in the target location information set;

determining, based on the coverage area of the target location information set, a delimited area corresponding to the topic;

acquiring a topic corresponding to the delimited area in response to determining, based on the location information of the first terminal, that the first terminal is positioned in the delimited area, wherein the delimited area includes a geographic location range of a terminal allowed to publish a post related to the topic; and publishing, based on the topic, the post carried in the first publish request, such that the first terminal and other terminals display the post carried in the first publish request in a page area corresponding to the topic.

According to a second aspect, an apparatus for publishing a post is provided. The apparatus includes:

a processor; and a memory configured to store at least one instruction executable by the processor;

wherein the processor, when executing the at least one instruction, is caused to perform a method for publishing a post, the method comprising:

receiving a first publish request from a first terminal, wherein the first publish request carries a post to be published and location information of the first terminal;

acquiring a plurality of posts published within a first duration, wherein the first duration is a time duration before current time and closest to the current time;

acquiring location information of a terminal for publishing each of the plurality of posts to obtain a plurality of pieces of location information, wherein the plurality of pieces of location information are in one-to-one correspondence with the plurality of posts;

acquiring a plurality of location information sets by clustering the plurality of pieces of location information;

determining, based on location information contained in each of the plurality of location information sets, a coverage area of each of the plurality of the location information sets and a diameter of the coverage area of each of the plurality of the location information sets;

searching for a target location information set from the plurality of location information sets, wherein the quantity of location information contained in the target location information set is greater than a reference quantity, and a diameter of the coverage area of the target location information set is smaller than a reference diameter;

determining a topic based on posts corresponding to the location information in the target location information set;

determining, based on the coverage area of the target location information set, a delimited area corresponding to the topic;

acquiring a topic corresponding to the delimited area in response to determining, based on the location information of the first terminal, that the first terminal is positioned in the delimited area, wherein the delimited area includes a geographic location range of a terminal allowed to publish a post related to the topic; and publishing, based on the topic, the post carried in the first publish request, such that the first terminal and other terminals display the post carried in the first publish request in a page area corresponding to the topic.

According to a third aspect, a device for publishing a post is provided. The device includes:

a processor; and a memory configured to store at least one instruction executable by the processor;

wherein the processor is configured to perform the steps of any one of the methods as defined in the first aspect.

According to a third aspect, a non-transitory computer-readable storage medium storing at least one instruction is provided. The at least one instruction, when executed by a processor, causes the processor to perform a method for publishing a post, the method comprising:

receiving a first publish request from a first terminal, wherein the first publish request carries a post to be published and location information of the first terminal;

acquiring a plurality of posts published within a first duration, wherein the first duration is a time duration before current time and closest to the current time;

acquiring location information of a terminal for publishing each of the plurality of posts to obtain a plurality of pieces of location information, wherein the plurality of pieces of location information are in one-to-one correspondence with the plurality of posts;

acquiring a plurality of location information sets by clustering the plurality of pieces of location information;

determining, based on location information contained in each of the plurality of location information sets, a coverage area of each of the plurality of the location information sets and a diameter of the coverage area of each of the plurality of the location information sets;

searching for a target location information set from the plurality of location information sets, wherein the quantity of location information contained in the target location information set is greater than a reference quantity, and a diameter of the coverage area of the target location information set is smaller than a reference diameter;

determining a topic based on posts corresponding to the location information in the target location information set;

determining, based on the coverage area of the target location information set, a delimited area corresponding to the topic;

acquiring a topic corresponding to the delimited area in response to determining, based on the location information of the first terminal, that the first terminal is positioned in the delimited area, wherein the delimited area includes a geographic location range of a terminal allowed to publish a post related to the topic; and publishing, based on the topic, the post carried in the first publish request, such that the first terminal and other terminals display the post carried in the first publish request in a page area corresponding to the topic.

According to a fourth aspect, a computer program product including at least one instruction is provided. The computer program product, when run on a computer, causes the computer to perform the steps of any one of the methods as defined in the first aspect.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

Figure 1:
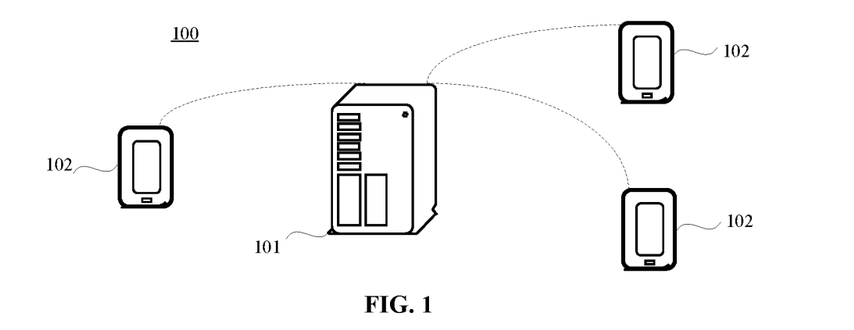
FIG. 1 is a schematic diagram of a system for publishing a post according to an embodiment of the present disclosure.

FIG. 1 is a schematic diagram of a system for publishing a post according to an embodiment of the present disclosure. As shown in FIG. 1, the system 100 includes a server 101 and a plurality of terminals 102, and each terminal 102 communicates with the server 101 in a wireless or wired manner.

Each terminal 102 may send a publish request to the server 101, such that the server 101 publishes a post of the terminal 102 based on the publish request. The server 101 publishing the post of the terminal 102 based on the publish request is introduced in the following embodiments.

In this embodiment, the terminal 102 may be a device, such as a mobile phone, a tablet computer, a desktop computer, or the like. FIG. 1 only takes a mobile phone as an example for explanation, which does not constitute a limitation to this embodiment.

Figure 2:
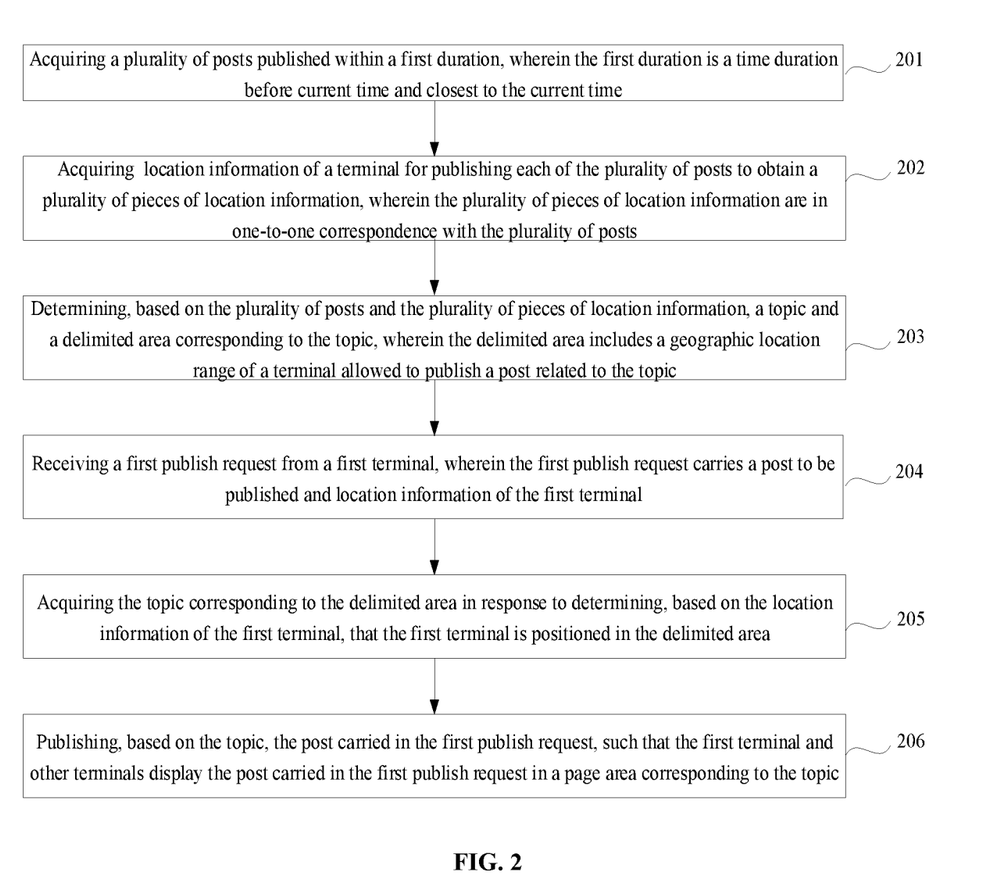
FIG. 2 is a flow chart of a method for publishing a post according to an embodiment of the present disclosure.

FIG. 2 is a flow chart of a method for publishing a post according to an embodiment of the present disclosure. The method is applied to the server shown in FIG. 1. As shown in FIG. 2, the method includes the following steps.

In step 201, a plurality of posts published within a first duration are acquired, wherein the first duration is a time duration before current time and closest to the current time.

In this embodiment, in order to improve the flexibility in publishing posts, the server may publish, based on location information, a post related to a topic, such that a user located in a delimited area corresponding to the topic may publish the post related to the topic. Therefore, before publishing the post related to the topic, the server needs to determine a topic to be initiated and a delimited area corresponding to the topic. The delimited area includes a geographic location range of the terminal allowed to publish the post related to the topic.

In another embodiment, if the quantity of posts published by the terminal in a certain area within a short period time exceeds a certain quantity, the terminal currently in the certain area is relatively active, and at this time, the server may determine the topic to be initiated and the delimited area corresponding to the topic by steps 201 to 203.

The first duration is a set duration, which may be 10 minutes, 20 minutes, 1 hour, or the like. For example, when the first duration is 10 minutes, what the server acquires at this time is posts published in the last 10 minutes.

In addition, the server may acquire the plurality of posts published within the first duration periodically, wherein the first duration is a time duration before current time and closest to the current time. That is, in this embodiment, the server may periodically determine the topic to be initiated and the delimited area corresponding to the topic by steps 201 to 203. For example, the server may determine the topic to be initiated and the delimited area corresponding to the topic every one hour, and then publish a post based on the determined topic and delimited area by the following steps 204 to 206.

In step 202, location information of a terminal for publishing each of the plurality of posts are acquired to obtain a plurality of pieces of location information, wherein the plurality of pieces of location information are in one-to-one correspondence with the plurality of posts.

In this embodiment, the server publishes, based on the location information, the post related to the topic. Therefore, when sending the post to be published to the server, the terminal also reports its own location information to the server, and the server receives the reported location information and stores the location information of the terminal, such that the server may perform the next operation based on the location information of the terminal. Based on this precondition, when acquiring the plurality of posts, the server may acquire, based on the stored location information, the location information of the terminal of each of the plurality of posts.

The terminal may report the location information to the server in the following way: the terminal acquires its own location information by means of its own location-based service (LBS) function, and reports the acquired location information to the server. Certainly, the terminal may also acquire its own location information in other ways, which is not specifically limited in this embodiment. In addition, the location information of the terminal is configured to describe a location where the terminal is located when publishing the post. Specifically, the location information of the terminal may be longitude and latitude data of the location where the terminal is located when publishing the post.

In step 203, a topic and a delimited area corresponding to the topic are determined based on the plurality of posts and the plurality of pieces of location information, wherein the delimited area includes a geographic location range of a terminal allowed to publish a post related to the topic.

In a possible embodiment, step 203 may specifically include: acquiring a plurality of location information sets by clustering the plurality of pieces of location information; determining, based on location information contained in each of the plurality of location information sets, a coverage area of each of the plurality of location information sets and a diameter of the coverage area of each of the plurality of location information sets; searching for a target location information set from the plurality of location information sets, wherein the quantity of location information contained in the target location information set is greater than a reference quantity, and a diameter of the coverage area of the target location information set is smaller than a reference diameter; determining the topic based on posts corresponding to the location information in the target location information set; and determining, based on the coverage area of the target location information set, the delimited area corresponding to the topic.

When there is one location information set in the plurality of location information sets that meets such conditions: the quantity of the location information included is greater than the reference quantity, and the diameter of the coverage area is smaller than the reference diameter, indicating that the terminal in the area corresponding to the location information set is relatively active at the current time. At this time, the location information set may be determined as the target location information set.

The reference quantity and the reference diameter are both set values. For example, the reference quantity may be 1,000, 1,500, or the like, and the reference diameter may be 200 meters, 300 meters, or the like. When the first duration is 10 minutes, the reference quantity is 1,000, and the reference diameter is 200 meters, the diameter of the area corresponding to the target location information set is less than 200 meters, and the terminal in the area corresponding to the target location information set publishes more than 1,000 posts within 10 minutes. At this time, the server may initiate a topic.

In addition, the plurality of pieces of location information may be clustered to acquire the plurality of location information sets using a K-means clustering algorithm, a hierarchical clustering algorithm, a density-based clustering algorithm, or the like, which is not specifically limited in the embodiments of the present disclosure.

Furthermore, the server may determine the topic based on the post corresponding to the location information in the target location information set in the following way: keyword identification is performed on the post corresponding to each piece of location information in the target location information set to acquire a plurality of keywords, and the topic is determined based on the keyword most likely to occur in the plurality of keywords. Optionally, after the server determines the target location information set, a background operator may also manually designate a topic based on the post corresponding to each piece of location information in the target location information set.

Furthermore, the server may determine, based on the coverage area of the target location information set, the delimited area corresponding to the topic in the following way: the server may directly use the coverage area of the target location information set as the delimited area corresponding to the topic. Certainly, the server may also determine the area corresponding to the circumcircle of the coverage area of the target location information set as the delimited area corresponding to the topic. Optionally, the background operator may also manually designate, based on the coverage area of the target location information set, the delimited area corresponding to the topic, which is not specifically limited in the embodiments of the present disclosure.

The above steps 201 to 203 are one implementation of determining the topic to be initiated and the delimited area corresponding to the topic according to the embodiment of the present disclosure. Optionally, in the embodiment of the present disclose, the background operator may also directly designate the topic to be initiated and the delimited area corresponding to the topic, which is not described in detail herein. For example, if XX University initiates a campus singer contest, a topic to be initiated "Campus Singer Contest" may be directly designated by the background operator at this time, and the delimited area of this topic is "XX University." After the server determines the topic and the delimited area corresponding to the topic, students in this university may upload their own singing videos to the server by the following steps 204 to 206 to take part in the contest by publishing posts.

After determining the topic to be initiated and the delimited area corresponding to the topic, the server may publish the topic to each terminal, such that each terminal publishes a post based on the topic by the following steps 204 to 206. For example, after determining the topic to be initiated, the server may display a page area corresponding to the topic on a display interface of each terminal, and the post subsequently published by any terminal by the following steps 204 to 206 may be displayed in the page area corresponding on the topic.

In step 204, a first publish request from a first terminal is received, wherein the first publish request carries a post to be published and location information of the first terminal.

After determining the topic to be initiated and the delimited area corresponding to the topic, if the server receives the first publish request from the first terminal, the server may process the first publish request based on the determined topic and the delimited area corresponding to the topic, so as to publish the post based on the location information. The first terminal is any terminal.

When the server receives the first publish request from the first terminal, as the determined topic has a corresponding delimited area, the server needs to first determine, based on the location information of the first terminal, whether the first terminal is located in the delimited area. If the first terminal is located in the delimited area, the server publishes the post carried in the first publish request by the following steps 205 and 206, such that the first terminal and other terminals display the post carried in the first publish request in the page area corresponding to the topic. If the first terminal is not located in the delimited area, the server may publish the post carried in the first publish request in other ways. For example, the post carried in the first publish request is published in other areas not related to the topic.

When the delimited area is described by means of a latitude and longitude range, the server may determine, based on the location information of the first terminal, whether the first terminal is located in the delimited area in the following way: the longitude and the latitude at the location of the first terminal are determined based on the location information of the first terminal; if the longitude at the location of the first terminal falls within the longitude range corresponding to the delimited area, and the latitude at the location of the first terminal falls within the latitude range corresponding to the delimited area, it is determined that the first terminal is located in the delimited area. Certainly, in the embodiment of the present disclosure, whether the first terminal is located in the delimited area may be determined in other ways, for example, identification by a background operator, which is not described in detail herein.

In step 205, the topic corresponding to the delimited area is acquired in response to determining, based on the location information of the first terminal, that the first terminal is positioned in the delimited area.

It can be known from step 203 that the delimited area corresponds to one topic. Therefore, when it is determined that the first terminal is located in the delimited area based on the location information of the first terminal, the topic corresponding to the delimited area needs to be acquired to publish, according to following step 206, the post carried in the first publish request.

For example, the topic determined in step 203 is "XX Concert" and the delimited area corresponding to the topic is "XX City." At this time, if it is determined according to step 205 that the first terminal is located in XX City, the topic at this time may be acquired as "XX Concert."

In step 206, the post carried in the first publish request is published based on the topic, such that the first terminal and other terminals display the post carried in the first publish request in a page area corresponding to the topic.

In this embodiment of the present disclosure, after initiating the topic, the server may directly publish, based on the topic, the post carried in the first publish request when receiving the first publish request. After the server initiates the topic, the display interface of each terminal displays the page area for the topic. Therefore, after the server publishes, based on the topic, the post carried in the first publish request, the first terminal and other terminals display the post carried in the first publish request in the page area corresponding to the topic.

Optionally, after initiating the topic, the server may receive a lot of posts with similar contents to be published at the same time. At this time, in order to avoid that most of the posts viewed by the audience are the same, the server may filter the post carried in the first publish request and other recently received posts to be published, and publish the post carried in the first publish request after filtration, so as to improve the audience's experience in viewing the posts published by the server.

Therefore, in one implementation, step 205 may specifically include: acquiring a plurality of second publish requests whose difference between receiving time and the current time is smaller than a second duration, wherein a post carried in each of the plurality of second publish requests is not published, and each second publish request further carries location information; searching for, based on the plurality of acquired second publish requests, a second publish request carrying the location information consistent with the location information carried in the first publish request; and publishing the post carried in the first publish request if a similarity between the post carried in the found second publish request and the post carried in the first publish request is greater than a first threshold, and a similarity between the post carried in the first publish request and a configured message is greater than a similarity between the post carried in the found second publish request and the configured message, wherein the configured message is indicative of the topic.

The second duration is a preset duration, which may be 3 seconds, 5 seconds, 10 seconds, or the like. When the second duration is 3 seconds, the plurality of second publish requests is determined based on other published requests received by the server within 3 seconds before or after receiving the first publish request.

For any second publish request in the plurality of second publish requests, if the location information carried in the second publish request is consistent with the location information carried in the first publish request, the terminal sending the second publish request and the terminal sending the first publish request are located in the same place, and at this time, the post carried in the first publish request and the post carried in the second publish request are likely to be the same. Therefore, the server needs to first search for a second publish request carrying the location information consistent with the location information carried in the first publish request, and then to select one publish request from the found second publish request and the first publish request for processing.

Further, if the terminal sending the second publish request and the terminal sending the first publish request are located in the same place, the post carried in the first publish request and the post carried in the second publish request are likely to be different. Therefore, when selecting one publish request from the found second publish request and the first publish request, the server needs to consider the similarity between the post carried in the found second publish request and the post carried in the first publish request. One publish request is selected from the found second publish request and the first publish request for processing only when the post carried in the found second publish request is similar to the post carried in the first publish request.

In addition, as the delimited area is an area corresponding to one topic, when selecting one publish request from the found second publish request and the first publish request, the server also needs to consider the similarity between the post carried in each publish request and a configured message. The configured message is a preset message being indicative of the topic. For example, if the topic is "XX concert," text information in the configured message may be "XX concert," and image information in the configured message may be such information as posters of the concert.

In the embodiment of the present disclosure, if the similarity between the post carried in the found second publish request and the post carried in the first publish request is greater than the first threshold, and the similarity between the post carried in the first publish request and the configured message is greater than the similarity between the post carried in the found second publish request and the configured message, the server no longer publishes the post carried in the found second publish request after publishing the post carried in the first publish request.

If the similarity between the post carried in the found second publish request and the post carried in the first publish request is greater than the first threshold, but the similarity between the post carried in the first publish request and the configured message is less than or equal to the similarity between the post carried in the found second publish request and the configured message, at this time, the post carried in the second publish request is published, and the post carried in the first publish request is no longer published.

Moreover, if the similarity between the post carried in the found second publish request and the post carried in the first publish request is less than or equal to the first threshold, the post carried in the second publish request is processed in the way of publishing the post carried in the first publish request.

The server may determine the similarity between the post carried in the first publish request and the configured message, or the similarity between the post carried in the first publish request and the post carried in the second publish request by means of artificial intelligence (AI) recognition, which is not described in detail herein.

Optionally, the post carried in the first publish request may be a useless post, or a post prohibited from being published. Therefore, before acquiring the plurality of second publish requests whose difference between the receiving time and the current time is less than the second duration, the server may review the post carried in the first publish request. If the post passes the review, the received publish request is filtered according to the above method. If the post does not pass the review, it is unnecessary to process the first publish request as described above. That is, the post carried in the first publish request is no longer published.

The server reviews the post carried in the first publishing request by the following steps: reviewing the post carried in the first publish request, and if the post carried in the first publish request meets a review condition, acquiring the plurality of second publish requests whose difference between the receiving time and the current time is smaller than the second duration.

The review condition includes at least one of: a duration of a video contained in the post carried in the first publish request being greater than a third duration, a resolution of the video contained in the post carried in the first publish request being higher than a reference resolution, a similarity between each video frame in the video contained in the post carried in the first publish request and a reference image being smaller than a second threshold, and a similarity between a text contained in the post carried in the first publish request and a reference text being smaller than a third threshold, wherein the reference image includes an image prohibited from being published, and the reference text includes a text prohibited from being published.

Through the above review condition, it can be ensured that the duration of the video carried in the post published by the server is not too short and that the resolution of the video in the published post is relatively high, or it can be ensured that the video in the published post is not an illegal video or that paperwork in the published post is not illegal paperwork.

The aforementioned third duration is a set duration. For example, the third duration may be 3 seconds, indicating that if the duration of the video in the post carried in the first publish request is less than 3 seconds, the server may not publish the post carried in the first publish request.

Optionally, after the server processes the post carried in the first publish request as described above, the background operator may continue to review the post carried in the first publish request. When the background operator also determines that the post carried in the first publish request passes the review, the server publishes the post carried in the first publish request to perform double review on the post carried in the first publish request. Through manual review, the server may further filter out posts inconsistent with the topic, and/or posts whose contents are not attractive enough.

The background operator may continue to review the post carried in the first publish request in the following way: the server sends review prompt information to a background terminal, wherein the review prompt information carries the post carried in the first publish request; and publishes the post carried in the first publish request in response to receiving an acknowledgement from the background terminal. The acknowledgement from the background terminal may be triggered by the background operator via a preset operation, and the preset operation may be a click operation, a voice operation, a sliding operation, or the like.

In addition, after the server initiates the topic by the above steps 201 to 203, a validity period may be set for the topic. At this time, the server also needs to acquire the validity period of the topic when determining that the first terminal is located in the delimited area. If the receiving time of the first publish request falls within the validity period, the post carried in the first publish request is published based on the topic.

The validity period is a set time period, and the duration of the validity period may be one day, one week, one month, or the like. In addition, the validity period starts at the time when the server initiates the topic.

By the above steps 204 to 206, the server may sequentially publish, in the order of publishing time, the posts related to the topic in the delimited area in the page area corresponding to the topic, such that all users may directly view the post related to the topic in the page area, improving the flexibility in publishing posts.

For example, after initiating the topic "XX Concert," the server may display, in the page area corresponding to the topic, related posts of "XX Concert" associated with the topic in the page area in a listing fashion. When the user clicks on the page area, a terminal corresponding to the user may continuously play a plurality of posts in the page area. If the post includes a video, the user watches a plurality of continuously played small videos. That is, after one video is played, the next video is automatically loaded and played seamlessly, achieving a similar effect that one video includes a plurality of small videos. Besides, the user may quickly switch front and back video clips by tapping the screen.

Furthermore, after the server publishes, based on the topic, the post carried in the first publish request, other terminals may view and comment on the post carried in the first publish request to attract more users to publish posts. Other terminals may view and comment on the post carried in the first publish request in the following way: the server receives a request, from a second terminal, for viewing the post carried in the first publish request; and the post carried in the first publish request and comment options for the post carried in the first publish request are pushed to the second terminal, such that the second terminal displays the post carried in the first publish request and the comment options for the post carried in the first publish request. In this embodiment of the present disclose, the comment options may include a comment posting option, a like option and the like.

The location information of the second terminal is not limited in the embodiments of the present disclosure. That is, after publishing the post carried in the first publish request, terminals that are not in the delimited area may also view the post carried in the first publish request, so as to attract more users to watch a live show in the position where the delimited area is located. For example, XX district of XX city recently held a light show, and users who went to the light show may publish posts, at this time, the server may initiate the topic "light show" by the steps 201 to 203, and the topic corresponding to the delimited area is "XX District of XX City." At this time, users going to XX district of XX city to participate in the light show may publish posts in a page area corresponding to the topic, while other users not in this area may view spot news via the page area corresponding to the topic to attract more users to go to watch the light show on the spot.

Moreover, after the server initiates the topic, a link corresponding to the topic may also be shared on other applications or web pages, such that outside users may continue to view the posts in the topic by downloading the product. Thus, many people co-create topic contents to attract users to download and use the product based on a geographical location.

According to the embodiments of the present disclosure, in response to receiving the first publish request from the first terminal, it is necessary to first determine, based on location information of the first terminal, whether the first terminal is positioned in the delimited area, and a post carried in the first publish request can be published based on the topic only when the first terminal is positioned in the delimited area. That is, the embodiments of the present disclosure provide a method for publishing a topic-related post based on the location information, which improves the flexibility in publishing posts.

Figure 3:
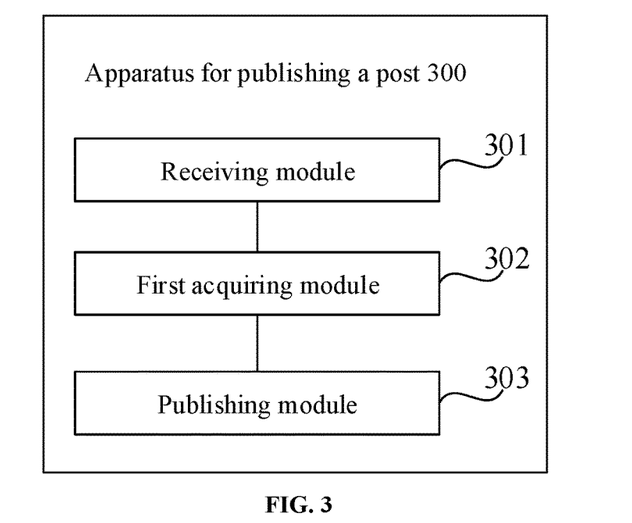
FIG. 3 is a block diagram of an apparatus for publishing a post according to an embodiment of the present disclosure.

FIG. 3 is a block diagram of an apparatus for publishing a post according to an embodiment of the present disclosure. As shown in FIG. 3, the apparatus 300 includes a receiving module 301, a first acquiring module 302, and a publishing module 303.

a receiving module 301, configured to receive a first publish request from a first terminal, wherein the first publish request carries a post to be published and location information of the first terminal;

a first acquiring module 302, configured to acquire a topic corresponding to a delimited area in response to determining, based on the location information of the first terminal, that the first terminal is positioned in the delimited area, wherein the delimited area includes a geographic location range of a terminal allowed to publish a post related to the topic; and a publishing module 303, configured to publish, based on the topic, the post carried in the first publish request, such that the first terminal and other terminals display the post carried in the first publish request in a page area corresponding to the topic.

Figure 4:
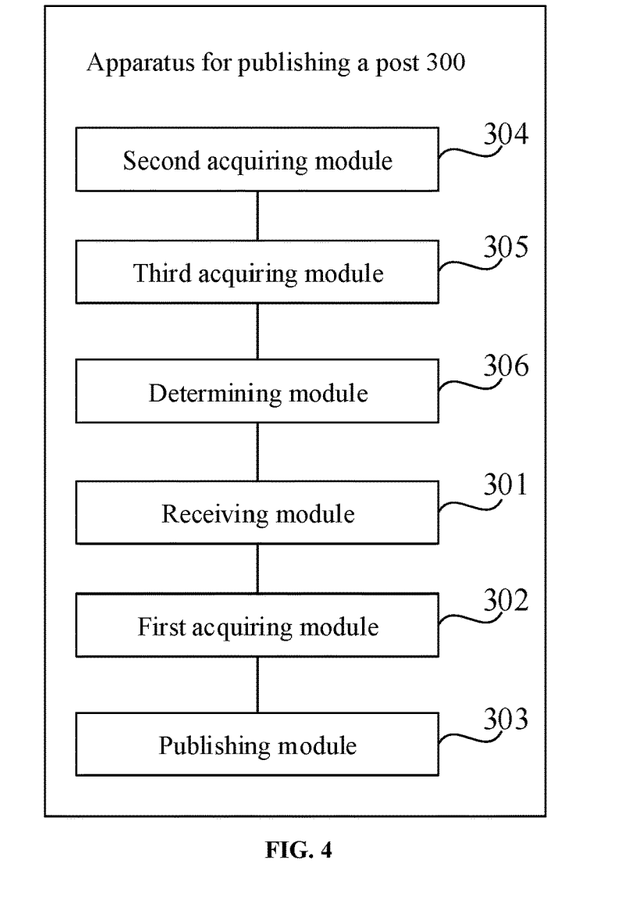
FIG. 4 is a block diagram of another apparatus for publishing a post according to an embodiment of the present disclosure.

Optionally, as shown in FIG. 4, the apparatus 300 further includes a second acquiring module 304, a third acquiring module 305, and a determining module 306.

a second acquiring module 304, configured to acquire a plurality of posts published within a first duration, wherein the first duration is a time duration before current time and closest to the current time;

a third acquiring module 305, configured to acquire location information of a terminal for publishing each of the plurality of posts to obtain a plurality of pieces of location information, wherein the plurality of pieces of location information are in one-to-one correspondence with the plurality of posts; and a determining module 306, configured to determine, based on the plurality of posts and the plurality of pieces of location information, a topic and a delimited area corresponding to the topic.

Optionally, the determining module 306 is specifically configured to:

acquire a plurality of location information sets by clustering the plurality of pieces of location information;

determine, based on location information contained in each of the plurality of location information sets, a coverage area of each of the plurality of the location information sets and a diameter of the coverage area of each of the plurality of the location information sets;

search for a target location information set from the plurality of location information sets, wherein the quantity of location information contained in the target location information set is greater than a reference quantity, and a diameter of the coverage area of the target location information set is smaller than a reference diameter;

determine the topic based on posts corresponding to the location information in the target location information set; and determine, based on the coverage area of the target location information set, the delimited area corresponding to the topic.

Optionally, the publishing module 303 is specifically configured to:

acquire a plurality of second publish requests whose difference between receiving time and the current time is smaller than a second duration, wherein a post carried in each of the plurality of second publish requests is not published, and each second publish request further carries location information;

search for, based on the plurality of acquired second publish requests, a second publish request carrying the location information consistent with the location information carried in the first publish request;

publish the post carried in the first publish request if a similarity between the post carried in the found second publish request and the post carried in the first publish request is greater than a first threshold, and a similarity between the post carried in the first publish request and a configured message is greater than a similarity between the post carried in the found second publish request and the configured message, wherein the configured message is indicative of the topic.

Optionally, the publishing module 303 is specifically configured to:

review the post carried in the first publish request, and if the post carried in the first publish request meets a review condition, acquire the plurality of second publish requests whose difference between the receiving time and the current time is smaller than the second duration;

wherein the review condition includes at least one of: a duration of a video contained in the post carried in the first publish request being greater than a third duration, a resolution of the video contained in the post carried in the first publish request being higher than a reference resolution, a similarity between each video frame in the video contained in the post carried in the first publish request and a reference image being smaller than a second threshold, and a similarity between a text contained in the post carried in the first publish request and a reference text being smaller than a third threshold, wherein the reference image includes an image prohibited from being published, and the reference text includes a text prohibited from being published.

Optionally, the publishing module 303 is specifically configured to:

send review prompt information to a background terminal, wherein the review prompt information carries the post carried in the first publish request; and publish the post carried in the first publish request in response to receiving an acknowledgement from the background terminal.

Optionally, the apparatus 300 further includes:

a fourth acquiring module, configured to acquire a validity period of the topic.

The publishing module is further configured to publish, based on the topic, the post carried in the first publish request if receiving time of the first publish request falls within the validity period.

According to this embodiment, in response to receiving the first publish request from the first terminal, it is necessary to first determine, based on location information of the first terminal, whether the first terminal is positioned in the delimited area, and a post carried in the first publish request can be published based on the topic only when the first terminal is positioned in the delimited area. That is, the embodiments of the present disclosure provide a method for publishing a topic-related post based on the location information, which improves the flexibility in publishing posts.

It should be noted that the apparatus for publishing the post according to the above embodiment, only takes division of all the functional modules as an example for explanation. In practice, the above functions may be assigned to be completed by the different functional modules as required. That is, the internal structure of the apparatus is divided into different functional modules to complete all or part of the functions described above. In addition, the apparatus for publishing the post according to the above embodiment has the same concept as the method for publishing the post according to the above embodiments. For the specific implementation of the apparatus, reference may be made to the method embodiments, which is not repeated herein.

Figure 5:
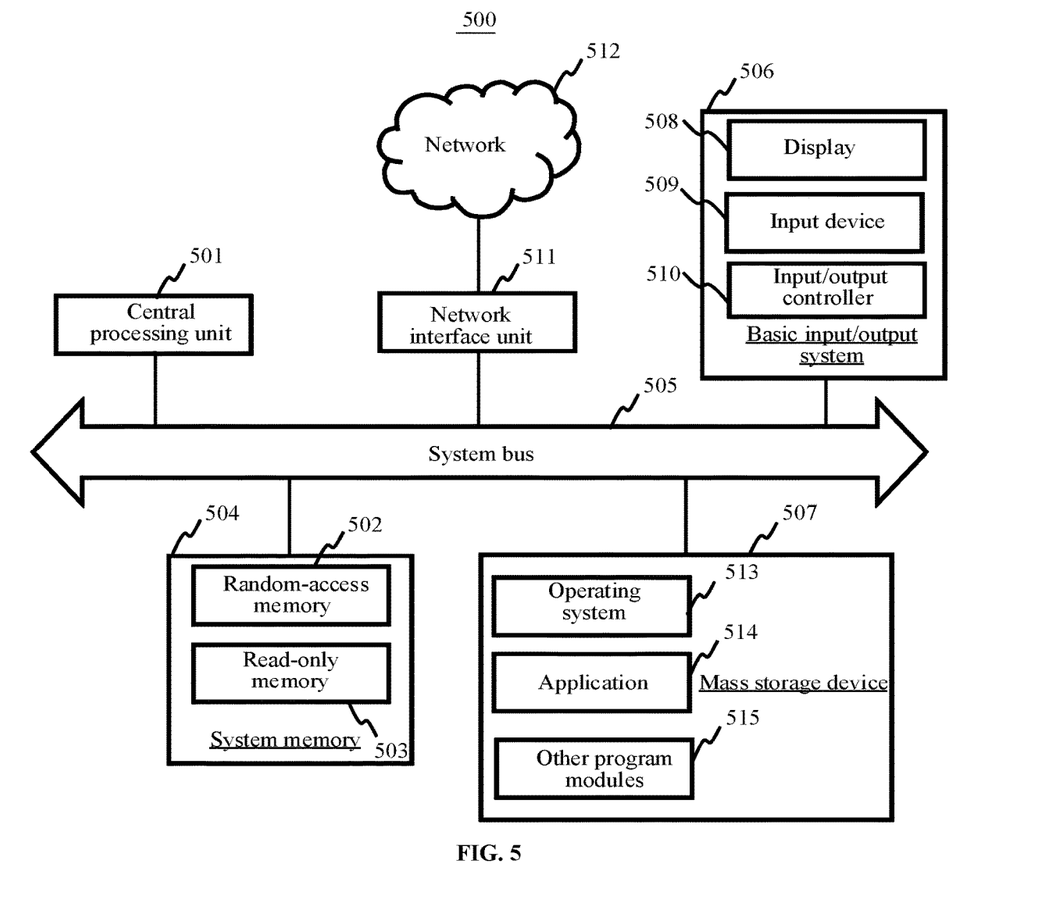
FIG. 5 is a schematic structural diagram of another apparatus for publishing a post according to an embodiment of the present disclosure.

FIG. 5 is a schematic structural diagram of an apparatus for publishing a post according to an embodiment of the present disclosure. The server shown in FIG. 1 may be implemented by the apparatus shown in FIG. 5, as shown in FIG. 5.

The apparatus 500 includes a central processing unit (CPU) 501, a system memory 504 including a random-access memory (RAM) 502 and a read-only memory (ROM) 503, and a system bus 505 connecting the system memory 504 and the CPU 501. The apparatus 500 further includes a basic input/output (I/O) system 506 which helps transmit information among various components within in a computer, and a mass storage device 507 configured to store an operating system 513, an application 514 and other program modules 515.

The basic I/O system 506 includes a display 508 configured to display information and an input device 509, such as a mouse, or a keyboard, configured to input information by the users. Both the display 508 and the input device 509 are connected to the CPU 501 through an input/output controller 510 connected to the system bus 505. The basic I/O system 506 may also include the input/output controller 510 for receiving and processing input from a plurality of other devices, such as a keyboard, a mouse, or an electronic stylus. Similarly, the input/output controller 510 further provides output to a display screen, a printer, or other types of output devices.

The mass storage device 507 is connected to the CPU 501 by a mass storage controller (not shown) connected to the system bus 505. The mass storage device 507 and a computer-readable medium associated therewith provide non-volatile storage for the apparatus 500. That is, the mass storage device 507 may include a computer-readable medium (not shown), such as a hard disk or a compact disc read-only memory (CD-ROM) driver.

Without loss of generality, the computer-readable medium may include a computer storage medium and a communication medium. The computer storage medium includes volatile and non-volatile, removable, and non-removable media implemented in any method or technology for storage of information such as a computer-readable instruction, a data structure, a program module, or other data. The computer storage medium includes a RAM, a ROM, an erasable programmable read only memory (EPROM), an electrically erasable programmable read-only memory (EEPROM), a CD-ROM, a digital video disc (DVD) or other optical storage; and a tape cassette, a magnetic tape, a magnetic disk storage or other magnetic storage devices. It will be known by a person skilled in the art that the computer storage medium is not limited to above. The above system memory 504 and the mass storage device 507 may be collectively referred to as the memory.

According to various embodiments of the present disclosure, the apparatus 500 may also be operated by being connected by a network such as the Internet to a remote computer device. That is, the apparatus 500 may be connected to the network 512 by a network interface unit 511 connected to the system bus 505, or that is, the computer device 500 may be connected to other types of networks or remote computer systems (not shown) by using the network interface unit 511.

The memory further includes one or more programs stored in the memory and configured to be executed by the CPU. The one or more programs include instructions for performing the method for publishing posts according to the above embodiment of the present disclosure.

An embodiment of the present disclosure further provides a non-transitory computer-readable storage medium. At least one instruction in the storage medium, when executed by a processor, causes the processor to perform the method for publishing the post according to the above embodiments.

An embodiment of the present disclosure further provides a computer program product including at least one instruction. The at least one instruction, when run on a computer, causes the computer to perform the method for publishing the post according to the above embodiments.

Persons of ordinary skill in the art can understand that all or part of the steps described in the above embodiments can be completed through hardware, or through related hardware instructed by a program stored in a computer-readable storage medium, such as a read-only memory, a disk, a CD, or the like.

Described above are merely exemplary embodiments of the present disclosure, and are not intended to limit the present disclosure. Within the spirit and principles of the present disclosure, any modifications, equivalent substitutions, improvements, and the like are within the protection scope of the present disclosure.

What is claimed is:

1. A method for publishing a post, comprising:
   receiving a first publish request from a first terminal, wherein the first publish request carries a post to be published and location information of the first terminal;
   acquiring a plurality of posts published within a first duration, wherein the first duration is a time duration before current time and closest to the current time,
   acquiring location information of a terminal for publishing each of the plurality of posts to obtain a plurality of pieces of location information, wherein the plurality of pieces of location information are in one-to-one correspondence with the plurality of posts;
   acquiring a plurality of location information sets by clustering the plurality of pieces of location information;
   determining, based on location information contained in each of the plurality of location information sets, a coverage area of each of the plurality of the location information sets and a diameter of the coverage area of each of the plurality of the location information sets,
   searching for a target location information set from the plurality of location information sets, wherein a quantity of location information contained in the target location information set is greater than a reference quantity, and a diameter of the coverage area of the target location information set is smaller than a reference diameter;
   determining a topic based on posts corresponding to the location information in the target location information set;
   determining, based on the coverage area of the target location information set, a delimited area corresponding to the topic;
   acquiring a topic corresponding to the delimited area in response to determining, based on the location information of the first terminal, that the first terminal is positioned in the delimited area, wherein the delimited area comprises a geographic location range of a terminal allowed to publish a post related to the topic; and
   publishing, based on the topic, the post carried in the first publish request, such that the first terminal and other terminals display the post carried in the first publish request in a page area corresponding to the topic.

2. The method according to claim 1, wherein publishing, based on the topic, the post carried in the first publish request comprises:
   acquiring a plurality of second publish requests whose difference between receiving time and current time is smaller than a second duration, wherein a post carried in each of the plurality of second publish requests is not published, and each second publish request further carries location information;
   searching for, based on the plurality of acquired second publish requests, a second publish request carrying the location information consistent with the location information carried in the first publish request; and
   publishing the post carried in the first publish request if a similarity between the post carried in the found second publish request and the post carried in the first publish request is greater than a first threshold, and a similarity between the post carried in the first publish request and a configured message is greater than a similarity between the post carried in the found second publish request and the configured message, wherein the configured message is indicative of the topic.

3. The method according to claim 2, wherein before acquiring the plurality of second publish requests whose difference between the receiving time and the current time is smaller than the second duration, the method further comprises:
   reviewing the post carried in the first publish request, and if the post carried in the first publish request meets a review condition, acquiring the plurality of second publish requests whose difference between the receiving time and the current time is smaller than the second duration;
   wherein the review condition comprises at least one of: a duration of a video contained in the post carried in the first publish request being greater than a third duration, a resolution of the video contained in the post carried in the first publish request being higher than a reference resolution, a similarity between each video frame in the video contained in the post carried in the first publish request and a reference image being smaller than a second threshold, and a similarity between a text contained in the post carried in the first publish request and a reference text being smaller than a third threshold, wherein the reference image comprises an image prohibited from being published, and the reference text comprises a text prohibited from being published.

4. The method according to claim 2, wherein before publishing the post carried in the first publish request, the method further comprises:
   sending review prompt information to a background terminal, wherein the review prompt information carries the post carried in the first publish request; and
   publishing the post carried in the first publish request in response to receiving an acknowledgement from the background terminal.

5. The method according to claim 1, wherein before publishing, based on the topic, the post carried in the first publish request, the method further includes:
   acquiring a validity period of the topic; and
   publishing, based on the topic, the post carried in the first publish request if receiving time of the first publish request falls within the validity period.

6. An apparatus for publishing a post, comprising:
   a processor; and
   a memory configured to store at least one instruction executable by the processor; wherein
   the processor, when executing the at least one instruction, is caused to perform a method for publishing a post, the method comprising:
   receiving a first publish request from a first terminal, wherein the first publish request carries a post to be published and location information of the first terminal;
   acquiring a plurality of posts published within a first duration, wherein the first duration is a time duration before current time and closest to the current time;
   acquiring location information of a terminal for publishing each of the plurality of posts to obtain a plurality of pieces of location information, wherein the plurality of pieces of location information are in one-to-one correspondence with the plurality of posts;

acquiring a plurality of location information sets by clustering the plurality of pieces of location information;

determining, based on location information contained in each of the plurality of location information sets, a coverage area of each of the plurality of the location information sets and a diameter of the coverage area of each of the plurality of the location information sets;

searching for a target location information set from the plurality of location information sets, wherein a quantity of location information contained in the target location information set is greater than a reference quantity, and a diameter of the coverage area of the target location information set is smaller than a reference diameter;

determining a topic based on posts corresponding to the location information in the target location information set;

determining, based on the coverage area of the target location information set, a delimited area corresponding to the topic;

acquiring a topic corresponding to the delimited area in response to determining, based on the location information of the first terminal, that the first terminal is positioned in the delimited area, wherein the delimited area comprises a geographic location range of a terminal allowed to publish a post related to the topic; and publishing, based on the topic, the post carried in the first publish request, such that the first terminal and other terminals display the post carried in the first publish request in a page area corresponding to the topic.

7. The apparatus according to claim 6, wherein publishing, based on the topic, the post carried in the first publish request comprises:

acquiring a plurality of second publish requests whose difference between receiving time and current time is smaller than a second duration, wherein a post carried in each of the plurality of second publish requests is not published, and each second publish request further carries location information;

searching for, based on the plurality of acquired second publish requests, a second publish request carrying the location information consistent with the location information carried in the first publish request; and publishing the post carried in the first publish request if a similarity between the post carried in the found second publish request and the post carried in the first publish request is greater than a first threshold, and a similarity between the post carried in the first publish request and a configured message is greater than a similarity between the post carried in the found second publish request and the configured message, wherein the configured message is indicative of the topic.

8. The apparatus according to claim 7, wherein before acquiring the plurality of second publish requests whose difference between the receiving time and the current time is smaller than the second duration, the method further comprises:

reviewing the post carried in the first publish request, and if the post carried in the first publish request meets a review condition, acquiring the plurality of second publish requests whose difference between the receiving time and the current time is smaller than the second duration;

wherein the review condition comprises at least one of: a duration of a video contained in the post carried in the first publish request being greater than a third duration, a resolution of the video contained in the post carried in the first publish request being higher than a reference resolution, a similarity between each video frame in the video contained in the post carried in the first publish request and a reference image being smaller than a second threshold, and a similarity between a text contained in the post carried in the first publish request and a reference text being smaller than a third threshold, wherein the reference image comprises an image prohibited from being published, and the reference text comprises a text prohibited from being published.

9. The apparatus according to claim 7, wherein before publishing the post carried in the first publish request, the method further comprises:

sending review prompt information to a background terminal, wherein the review prompt information carries the post carried in the first publish request; and publishing the post carried in the first publish request in response to receiving an acknowledgement from the background terminal.

10. The apparatus according to claim 6, wherein before publishing, based on the topic, the post carried in the first publish request, the method further includes:

acquiring a validity period of the topic; and publishing, based on the topic, the post carried in the first publish request if receiving time of the first publish request falls within the validity period.

11. A non-transitory computer-readable storage medium storing at least one instruction therein, wherein the at least one instruction, when executed by a processor, causes the processor to perform a method for publishing a post, the method comprising:

receiving a first publish request from a first terminal, wherein the first publish request carries a post to be published and location information of the first terminal;

acquiring a plurality of posts published within a first duration, wherein the first duration is a time duration before current time and closest to the current time;

acquiring location information of a terminal for publishing each of the plurality of posts to obtain a plurality of pieces of location information, wherein the plurality of pieces of location information are in one-to-one correspondence with the plurality of posts;

acquiring a plurality of location information sets by clustering the plurality of pieces of location information;

determining, based on location information contained in each of the plurality of location information sets, a coverage area of each of the plurality of the location information sets and a diameter of the coverage area of each of the plurality of the location information sets;

searching for a target location information set from the plurality of location information sets, wherein a quantity of location information contained in the target location information set is greater than a reference quantity, and a diameter of the coverage area of the target location information set is smaller than a reference diameter;

determining a topic based on posts corresponding to the location information in the tar get location information set;

determining, based on the coverage area of the target location information set, a delimited area corresponding to the topic;

acquiring a topic corresponding to the delimited area in response to determining, based on the location information of the first terminal, that the first terminal is positioned in the delimited area, wherein the delimited area comprises a geographic location range of a terminal allowed to publish a post related to the topic; and publishing, based on the topic, the post carried in the first publish request, such that the first terminal and other terminals display the post carried in the first publish request in a page area corresponding to the topic.

12. The storage medium according to claim 11, wherein publishing, based on the topic, the post carried in the first publish request comprises:

acquiring a plurality of second publish requests whose difference between receiving time and current time is smaller than a second duration, wherein a post carried in each of the plurality of second publish requests is not published, and each second publish request further carries location information;

searching for, based on the plurality of acquired second publish requests, a second publish request carrying the location information consistent with the location information carried in the first publish request; and publishing the post carried in the first publish request if a similarity between the post carried in the found second publish request and the post carried in the first publish request is greater than a first threshold, and a similarity between the post carried in the first publish request and a configured message is greater than a similarity between the post carried in the found second publish request and the configured message, wherein the configured message is indicative of the topic.

13. The storage medium according to claim 12, wherein before acquiring the plurality of second publish requests whose difference between the receiving time and the current time is smaller than the second duration, the method further comprises:

reviewing the post carried in the first publish request, and if the post carried in the first publish request meets a review condition, acquiring the plurality of second publish requests whose difference between the receiving time and the current time is smaller than the second duration;

wherein the review condition comprises at least one of: a duration of a video contained in the post carried in the first publish request being greater than a third duration, a resolution of the video contained in the post carried in the first publish request being higher than a reference resolution, a similarity between each video frame in the video contained in the post carried in the first publish request and a reference image being smaller than a second threshold, and a similarity between a text contained in the post carried in the first publish request and a reference text being smaller than a third threshold, wherein the reference image comprises an image prohibited from being published, and the reference text comprises a text prohibited from being published.

14. The storage medium according to claim 12, wherein before publishing the post carried in the first publish request, the method further comprises:

sending review prompt information to a background terminal, wherein the review prompt information carries the post carried in the first publish request; and publishing the post carried in the first publish request in response to receiving an acknowledgement from the background terminal.

15. The storage medium according to claim 11, wherein before publishing, based on the topic, the post carried in the first publish request, the method further includes:

acquiring a validity period of the topic; and publishing, based on the topic, the post carried in the first publish request if receiving time of the first publish request falls within the validity period.

* * * * *